March 9, 1971 H. PROLSS 3,570,005
RADIO RECEIVER INPUT CIRCUIT FOR REDUCED
LOADING BY CAPACITIVE ANTENNAS
Filed Feb. 26, 1968
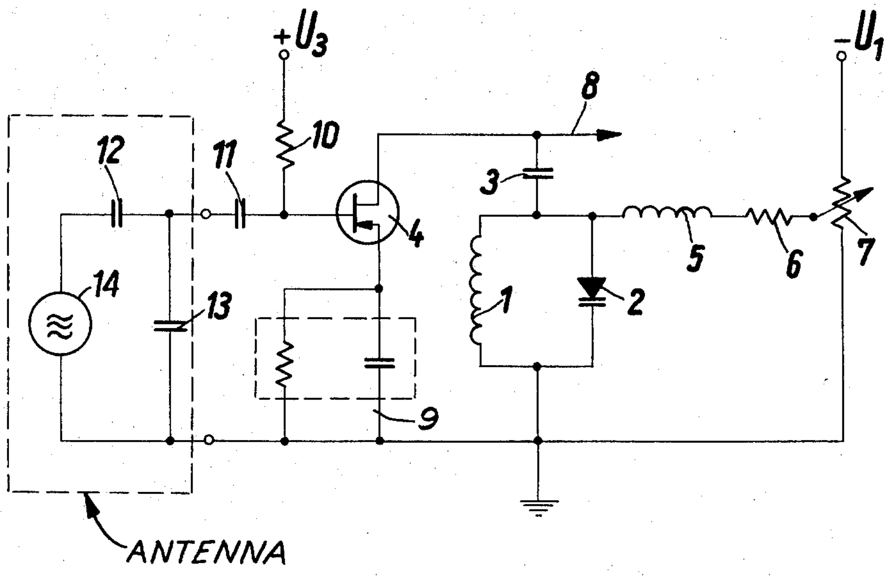
Inventor:
HANS PRÖLSS
by Ralph H. Frishauf
Atty.

3,570,005
RADIO RECEIVER INPUT CIRCUIT FOR REDUCED LOADING BY CAPACITIVE ANTENNAS

Hans Prolss, Hildensheim, Niedersachsen, Germany, assignor to Blaupunkt-Werke G.m.b.H., Hildesheim, Germany Filed Feb. 26, 1968, Ser. No. 708,143
Claims priority, application Germany, Apr. 14, 1967, B 92,064
Int. Cl. H04b 1/18, 1/28
U.S. Cl. 325—376 5 Claims

ABSTRACT OF THE DISCLOSURE

To overcome the effect of antenna capacity on tuning of radio receivers, particularly automobile receivers, the emitter-collector path of a field effect transistor is connected in parallel with a tuned circuit including a fixed inductance and a diode of variable capacitance, the bias of the diode determining the resonant frequency of the tuned circuit; the antenna is connected to the base of the field effect transistor, which is further supplied with a variable bias.

The present invention relates to a tuned input circuit for radio receivers, and particularly for automobile receivers, in which the capacity of the antenna strongly affects tuning of the input circuit.

Radio receivers for mobile use, and particularly automobile radio receivers differ from fixed radio receivers particularly in the method of tuning the input circuit. Ordinarily, automobile receivers use a variable inductance to provide for station selection. This is due to the fact that the receiver is coupled to the transmitter over the capacity of the automobile antenna, which is low in the region of the broadcast and longwave band. The antenna electrically acts as a capacity is thus entirely connected across the input circuit. It is therefore difficult to tune the input circuit by an additionally connected variable tuning condenser since, at low frequencies, the input impedance of the input circuit decreases causing excessive noise. Even interposition of a transformer between the antenna and a capacitively tuned input circuit is not a sufficient solution and does not result in sufficient noise suppression. For this reason, tuned input circuits of automobile radio receivers are tuned usually by variable inductances.

A simple and inexpensive way to tune the capacity of input circuits is to utilize diodes having a variable reactance, that is voltage-sensitive diodes (also known as "varactor" diodes). It is desirable to utilize such electrically tunable elements. However, so far electronically regulatable inductances are not yet available as mass production products.

It is an object of the present invention to provide an input circuit for radio receivers in which an electrically controllable element of variable capacitance can be utilized without introducing a high noise level at low frequency ranges.

Subject matter of the present invention: Briefly, a field effect transistor has its emitter-collector path connected in parallel with the parallel resonance circuit, formed of a fixed inductance and a variable-capacity diode. The antenna, for example an automobile whip-type antenna is connected to the base of the field effect transistor. Tuning of the circuit then is accomplished by changing the bias across the variable capacitance diode. It has been found that this circuit is essentially noise-free over the entire freqeuncy range of broadcast and longwave bands.

The single figure illustrates a schematic circuit diagram of the input circuit in accordance with the present invention. The biasing arrangement is not shown. Only the A.C. circuit operation is shown and discussed.

A fixed inductance 1 has a diode 2, of variable capacity connected in parallel therewith. One terminal of the thus formed resonance circuit is connected to a source of ground potential. The other terminal of the resonance circuit is connected over a condenser 3 with the collector of a field effect transistor 4. Additionally, it is connetced over a choke 5 and a resistance 6 of high value to the tap point of a potentiometer 7. One end of potentiometer 7 is connected to terminal ground, the other to a terminal $U_1$ of a source of negative bias supply.

The tuned RF signal output is obtained at line 8 from the collector of the field effect transistor 4, to be applied to a further amplifier, or mixing stage (not shown). The emitter of field effect transistor 4 is connected over an R-C circuit 9 to ground potential. The base of the field effect transistor 4 is connected over a resistance 10 to a terminal $U_3$ of a positive bias source. Additionally, it is connected over a condenser 11 to an antenna, indicated by its equivalent circuit capacities 12 and 13 and its equivalent signal source 16. The other end of the antenna is connected with ground potential.

The circuit is tuned by change of the tap point of potentiometer 7. The range of potential necessary is determined by the characteristics of the varactor diode 2.

For multi-range receivers, inductance 1 is preferably connected to a range switch, putting inductances of various values in circuit.

The potential $U_3$ is preferably variable in order to match the amplification of the input circuit to signal strength; in high-signal strength areas, the potential difference of $U_3$ and ground may be less. The change in value of $U_3$ may be done automatically by sensing the input signal strength.

The present invention has been described in connection with the input circuit of automobile receivers; various structural changes and modifications, as determined by requirements of particular applications or uses may be made without departing from the inventive concept.

I claim:

1. Receiver input circuit for RF signals for connection to an antenna that electrically acts substantially as a capacitance impedance at the freqeuncies being received, the capacity of the antenna being of such a magnitude to normally adversely affect the tuning of a tuned input stage, comprising
- a resonant circuit (1, 2) having a variable tuning capacitance (2); and
- a field effect transistor (4) having its emitter-collector path connected in parallel with said resonant circuit, the base of said field effect transistor being connected to said antenna.

2. Circuit according to claim 1 wherein the resonant circuit comprises an inductance (1) of fixed value, a diode (2) of variable capacity connected in parallel with said inductance, a source of variable voltage ($U_1$) to control the capacity of said diode; and a filter (5) interconnecting one source of said diode with one terminal of said source of variable voltage, said terminal being further capacitively coupled to the collector of the field effect transistor (4), the other terminal of said diode being connected to the other terminal of said source of variable voltage.

3. Circuit according to claim 1 including a second source of variable bias voltage ($U_3$) connected to the base of the field effect transistor.

4. In an automobile radio receiver adapted to be connected to a whip antenna that electrically acts substantially as a capacitive impedance at the freqeuncies being received, a resonant circuit comprising a fixed inductance connected in parallel with a variable-capacity diode, a source of variable voltage connected to said diode to tune said resonant circuit by varying the voltage across said diode; and a field effect transistor, the emitter-collector path of said field effect transistor being connected across said resonant circuit; the base of said field effect transistor being connectable to said antenna.

5. Circuit according to claim 3 wherein said second source of variable bias voltage ($U_3$) varies in accordance with the field strength of the signal being received.

References Cited

UNITED STATES PATENTS

| | | | |
|---|---|---|---|
| 2,529,370 | 11/1950 | Bell | 325—381 |
| 3,204,207 | 8/1965 | Denker | 325—319 |

OTHER REFERENCES

Richman, Paul: Characteristics and Operation of MOS Field-Effect Devices, New York, McGraw-Hill Book Company, copyright 1967.

ROBERT L. RICHARDSON, Primary Examiner

H. W. BRITTON, Assistant Examiner

U.S. Cl. X.R.

325—319, 381